Figure 1:
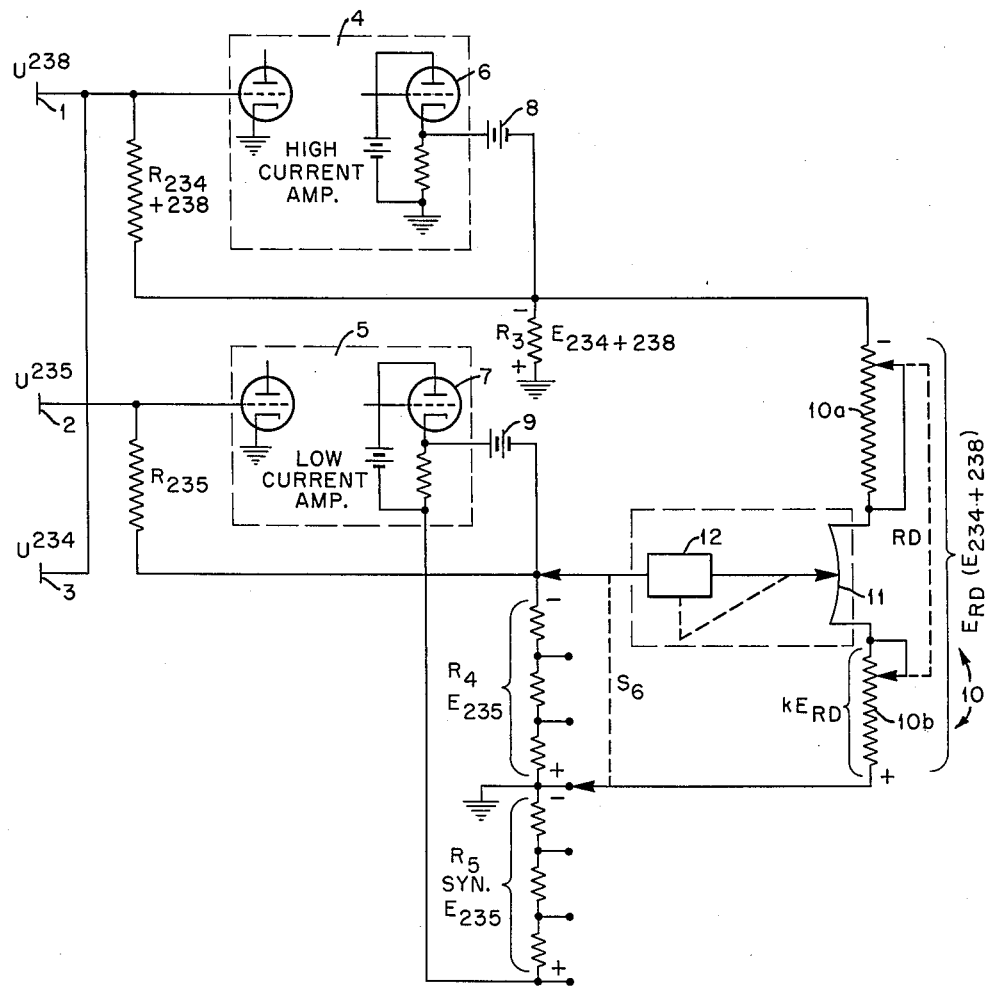

INVENTOR.
John R. Mahoney
BY
ATTORNEY

Jan. 29, 1963 J. R. MAHONEY 3,076,091
MEASURING CIRCUIT
Filed May 24, 1960 3 Sheets-Sheet 2

INVENTOR.
John R. Mahoney
BY
ATTORNEY

Jan. 29, 1963   J. R. MAHONEY   3,076,091
MEASURING CIRCUIT
Filed May 24, 1960   3 Sheets-Sheet 3

INVENTOR.
John R. Mahoney
BY
ATTORNEY

United States Patent Office

3,076,091
Patented Jan. 29, 1963

3,076,091
MEASURING CIRCUIT
John R. Mahoney, Oak Ridge, Tenn., assignor to The United States of America as represented by the United States Atomic Energy Commission
Filed May 24, 1960, Ser. No. 31,501
5 Claims. (Cl. 250—41.9)

This invention relates to measuring circuits and more particularly to a circuit especially adapted to and useful for the determination of isotope abundance ratios, mol percentages, and/or weight percentages of a mass spectrometer.

It has generally been the practice in arriving at abundance ratios such as $$\frac{U^{235}}{U^{238}}$$

to measure the $U^{235}$ content and the $U^{238}$ content in separate measurements and by calculation from these measurements, arrive at the ratio. If these measurements are undertaken on a process stream, both the pressure and the composition may change between measurements of $U^{235}$ and $U^{238}$. Under these conditions, the measurements would not be made on the same sample, and in addition, the ratio is not directly measurable but requires the time-consuming step of calculation. The same is true in making determinations of mol percent, such as $$\frac{U^{235}}{U^{238}+U^{235}} \times 100$$

In an attempt to overcome some of these inaccuracies in measurement and those resulting from changes in composition and pressure, it has been the practice to isolate a sample from a process stream and take a series of measurements which include a plurality of measurements of the $U^{235}$ peak and the $U^{238}$ peak, and by plotting and projection, arrive at values for these peaks that are adjusted for drift, Hanson, et al., Serial No. 17,442, now Patent No. 3,012,139. The circuits involved are complicated, and the procedure followed is time consuming, and requires additional steps of calculation to arrive at abundance ratios and mol percent.

Electrical ratio measuring systems were known to the prior art. In one form, a current proportional to one of two input voltages is fed through an adjustable impedance to develop a voltage which in part is fed into a balancing circuit. A current proportional to the other input voltage is fed through a second and independent adjustable impedance to develop a voltage which in part is fed into the balancing circuit. The two are combined subtractively in the balancing circuit and one of the impedance contacts is set to measure the mol fraction of said currents. No effort is made to combine the currents so that summation would occur so as to permit accurate determination of mol fraction but instead, a signal for improving the regulation of sample gas flow is derived. Nor is there any provision for increasing sensitivity without impairing the measurement of mol fractions nor is such a system readily adaptable for automatic zeroing. An example of such a system may be found in the patent to Williams, 2,522,976.

Applicant with a knowledge of these problems of the prior art, has for an object of his invention the provision of a system for use with a mass spectrometer that will permit measurements that are simultaneous in time on the same sample that will yield abundance and/or mol percent.

Applicant has as another object of his invention the provision of a measuring system for a mass spectrometer that will permit the direct measurement of abundance ratios and mol percent.

Applicant has as another object of his invention the provision of simplified circuitry for indicating abundance ratios and/or mol percent by the simultaneous measurement of the components of a mixture in a single operation.

Applicant has as another object of his invention the provision of a measuring circuit for a mass spectrometer that may be shifted from measurement of abundance ratios to mol percentage.

Other objects and advantages of my invention will appear from the following specification and accompanying drawings and the novel features thereof will be particularly pointed out in the annexed claims.

Figure 2:
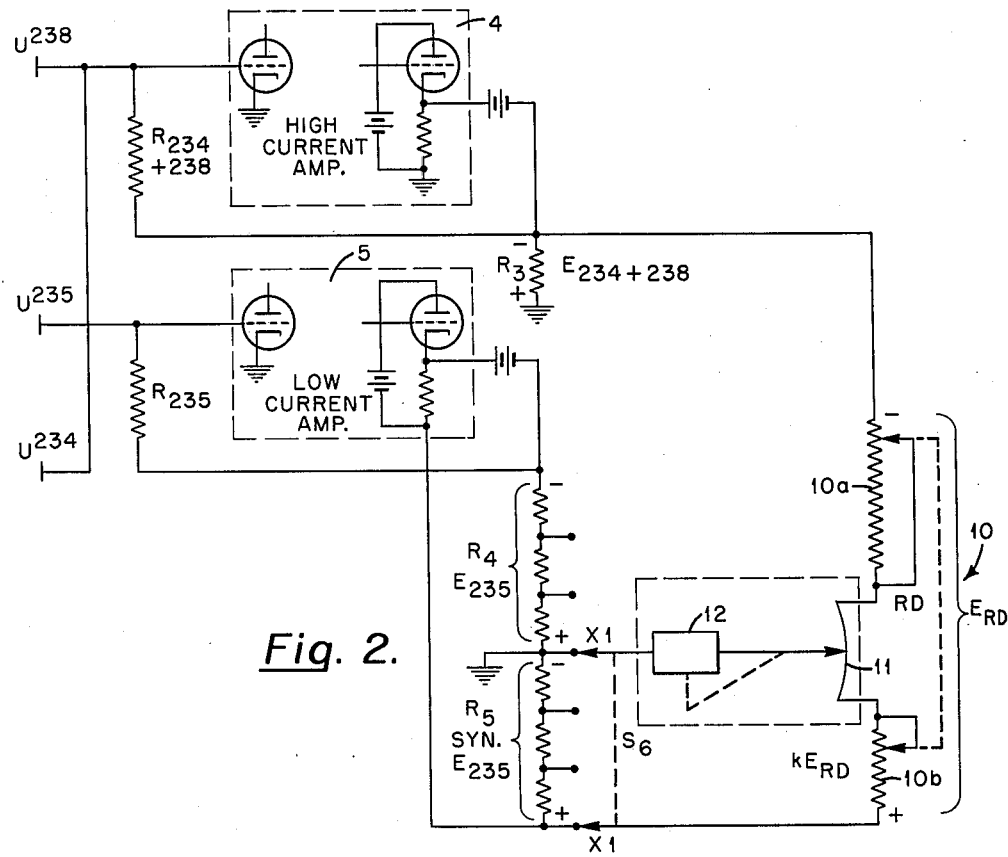
Figure 2A:
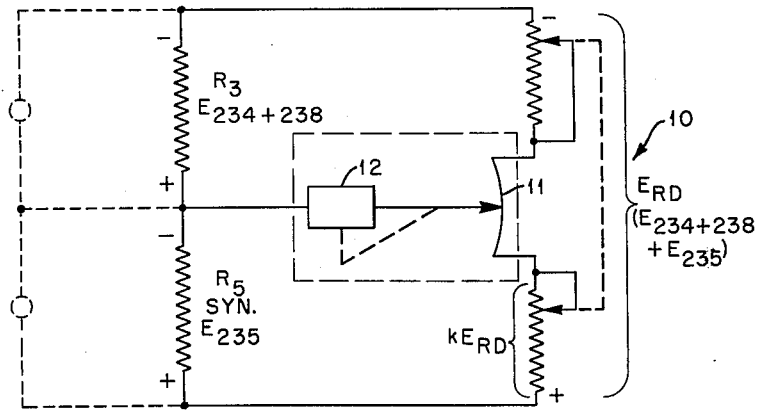
Figure 3:
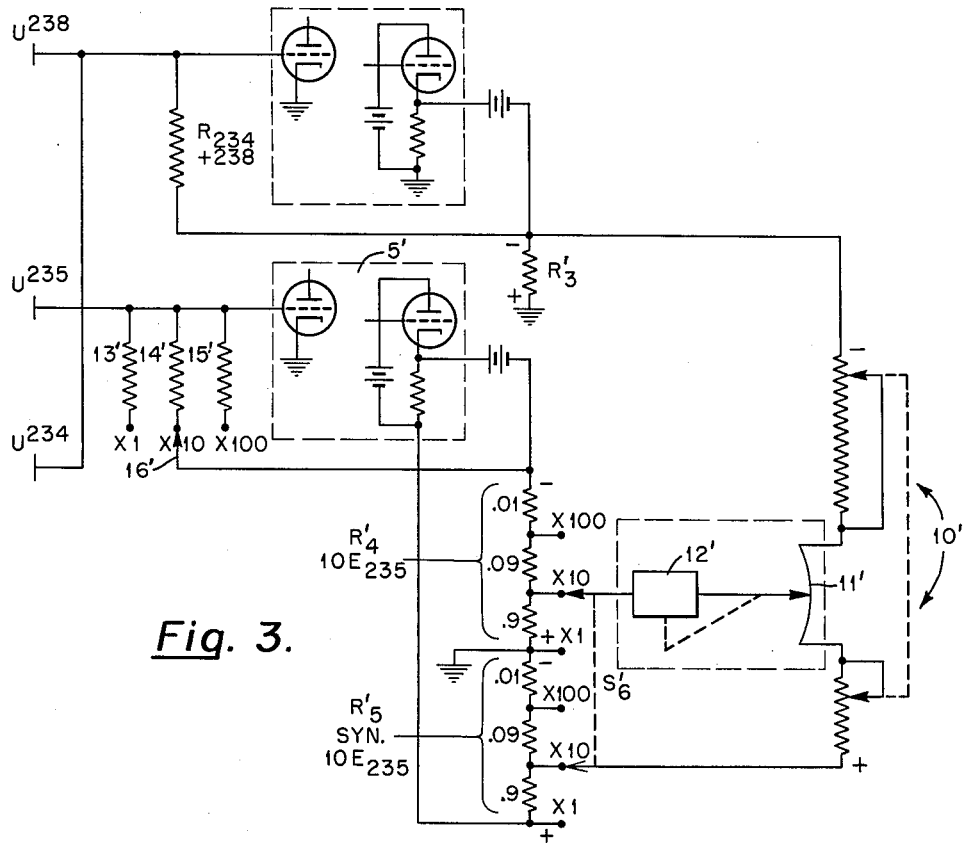
Figure 3A:
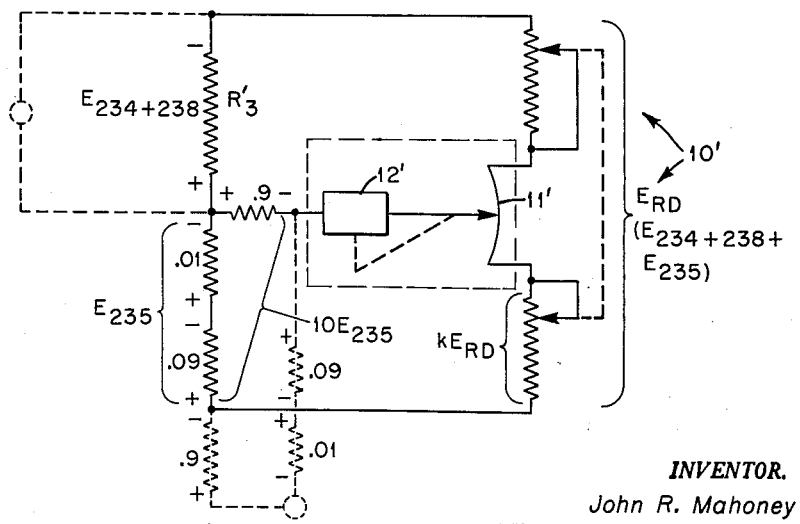

In the drawings, FIG. 1 is a simplified circuit diagram of applicant's improved measuring circuit positioned to read mol ratio. FIG. 2 is a schematic of the same circuit positioned to read mol percent on the XI scale or contact. FIG. 2A is an equivalent circuit for the system of FIG. 2. FIG. 3 is a modification of the circuit of FIG. 1 positioned to read mol percent on the X–10 scale or contact. FIG. 3A is the equivalent circuit for the system of FIG. 3.

Applicant's circuit is of the direct-reading ratio recorder type and is best suited for the measurement of either isotope abundance ratios or isotope mol percentages, as desired. In addition, the circuit is adaptable for the measurement of isotope weight percentages. The circuit is characterized by the advantage that it provides a signal output which is proportional to the total of the ion currents reaching the collectors. The inventor has discovered that improved spectrometer operation can be obtained by employing this "summation" signal to control the gas input to the spectrometer ion source, thus maintaining the total ion current at a constant value.

Referring to the drawings in detail, and particularly to FIG. 1, the system is shown connected to the collector plates of a mass spectrometer. The spectrometer tube is of conventional design except that it is provided with three collector plates. Collectors 1, 2 and 3 may be used for the collection, respectively, of the isotopes $U_{238}F_5{}^+$, $U_{235}F_5{}^+$ and $U_{234}F_5{}^+$. The collectors 1, 3 are joined together to combine the $U_{238}F_5{}^+$ and the $U_{234}F_5{}^+$ signals for feeding into the input of a high current amplifier 4. In the alternative, a single collector may be employed for these latter isotopes instead of joining two collectors. A conventional Consolidated Electrodynamics Corporation Spectrometer Model No. 2 1–320 is suitable for this purpose. The collector 2 for the $U_{235}F_5{}^+$ beam is connected to feed into the input of a low current amplifier 5. Both high current amplifier 4 and low current amplifier 5 are of the high gain-negative feed back type, and preferably should have similar time constants. Each amplifier terminates in a final cathode follower stage 6, 7. The cathode follower stage for each amplifier conducts at a maximum when the input to the amplifier is zero. One form of amplifier that will conduct at a maximum when the input is zero would be an amplifier having an odd number of plate amplifier stages. As shown, bucking batteries 8, 9 are connected across the cathode followers 6, 7 to reduce the amplifier outputs to zero when there is no input. As the input signal increases the amplifier output decreases and the bucking voltage of the battery predominates. Therefore during operation the output voltage from each amplifier-battery combination is equal to the difference between the greater bucking battery voltage and the lesser voltage developed across the cathode follower.

The high current amplifier 4 is preferably provided with 100 percent feed back to get output voltage which is proportional to ion current. Any high impedance input current amplifier that is capable of measuring spectrometer current and which will provide low output impedance will be suitable. Its output voltage, $E_{234}+E_{238}$ is dropped across the ground resistor $R_3$ bridged across the output circuit. Since the voltage of source 8 predominates, the polarity of the voltage developed across resistor $R_3$ is as indicated in FIG. 1. The low-current amplifier 5 should be provided with 50 percent feed back in order to give a simple way of obtaining the synthetic $E_{235}$. Its output, which is equal to twice the input to the amplifier, is coupled into and dropped across two series-connected resistors $R_4$ and $R_5$. The junction point of these resistors is grounded. Resistors $R_4$ and $R_5$ are of equal value so that $E_{235}$ and synthetic $E_{235}$ are of equal value, and consequently a voltage equal to the input voltage of the amplifier is developed across each of these resistors. As shown, the voltages across resistors $R_4$ and $R_5$ are opposite in sign with respect to ground. The voltage across resistor $R_4$ is termed "$E_{235}$," whereas that across resistor $R_5$ is termed "synthetic $E_{235}$."

Series resistors $R_4$ and $R_5$ are tapped, and ganged switch $S_6$ is adapted to move across spaced contacts of the tapped resistors for coupling selected portions to a potentiometer or decade 10. If it takes the form of a potentiometer, it may be made in two parts 10a, 10b having ganged sliders that are manually operated to put in as much resistance from one part as is taken out by the other in their common circuit. Resistor $R_3$ is coupled to the upper end of potentiometer or decade 10 and the slide 11 is a part of a conventional self-balancing recorder 12, such as a Leeds & Northrup potentiometer recorder, to switch $S_6$. Ganged switch $S_6$ has "ratio" and "mol percent" positions. In the "ratio" position, shown in FIG. 1, switch $S_6$ connects the decade or potentiometer 10 through self-balancing recorder 12 directly across the resistor $R_3$. The voltage $E_{RD}$, across the decade or potentiometer, thus is equal to $E_{234}+E_{238}$. In the "ratio" position, the switch $S_6$ also connects resistor $R_4$ into the balancing circuit of the recorder, as shown.

In a normal balancing operation the recorder slide wire is positioned automatically by servo motor in recorder 12 to null out the voltage across $R_4$ with a fraction of the voltage $E_{RD}$, the drop across the lower part of "put and take" ganged potentiometer 10 is designated $kE_{RD}$.

With the circuit at balance, the following relationship obtains:

$$\frac{kE_{RD}}{E_{RD}} = \frac{E_{235}}{E_{234+238}}$$

Assuming that the input resistors $R_{235}$ and $R_{234+238}$ are equal, and that the amplifiers have like characteristics, then $$\frac{kE_{RD}}{E_{RD}} = \frac{I_{235}}{I_{234+238}}$$

and the recorder is read directly in terms of abundance ratio. In the event that the low-current amplifier 5 is provided with a selection of input resistors, the operator applies a scale factor $$\frac{R_{234+238}}{R_{235}}$$

to obtain the correct abundance ratio.

FIG. 2 is the same circuit as shown in FIG. 1, but switch $S_6$ has been shifted to the position for measuring mol percent, that is $$\frac{I_{235}}{I_{234+238}+I_{235}} \times 100$$

The circuit is for the condition illustrated $R_{235+238}=R_{235}$. In this position, the switch $S_6$ serves to connect resistor $R_5$ in series with decade 10. Voltage from the low current amplifier source 5 is placed across resistor $R_5$ in order to get a polarity which is opposite in relation to ground to that across resistor $R_3$ so it can be summed properly with the polarity of the potential across resistor $R_3$ and provide a potential across potentiometer 10 equal to $E_{234+238}$ plus synthetic $E_{235}$. The equivalent circuit for this arrangement is shown in FIG. 2A where the potentials across resistors $R_3$, $R_5$ are treated as sources. As indicated, the voltage now impressed across potentiometer 10 is the sum of the voltages developed across $R_3$ and $R_5$—i.e., $E_{234+238}+E_{235}$. Normally, the recorder slidewire 11 is positioned automatically by the recorder 12 to null out the voltage across resistor $R_5$ with a fraction $kE_{RD}$ of the decade or potentiometer voltage. With the circuit at balance, $$\frac{kE_{RD}}{E_{RD}} = \frac{E_{235}}{E_{234+238}+E_{235}}$$

Assuming $R_{235}=R_{234+238}$, then $$\frac{kE_{RD}}{E_{RD}} = \frac{I_{235}}{I_{234+238}+I_{235}}$$

The recorder thus can be calibrated in terms of mol percent (mol ratio×100).

As previously indicated, this measuring circuit is adapted to measure mol percent by establishing the following relationship at circuit balance:

$$\frac{kE_{RD}}{E_{RD}} = \frac{E_{235}}{E_{234+238}+E_{235}}$$

This equation assumes equal input resistors for the amplifiers. It is desirable, however, for the low-current amplifier to be provided with a selection of input resistors, thus providing a choice of circuit sensitivities. For example, a selected input resistor might be switched into the circuit to increase the input voltage to the amplifier 5 by a factor of ten. The desired circuit sensitivity then would be obtained only if the voltage $10E_{235}$ is balanced against $kE_{RD}$. With regard to the voltage across the potentiometer 10, however, it is necessary that the unmultiplied voltage ($E_{235}$) be added to the voltage $E_{234+238}$. Application of the unmultiplied voltage $E_{235}$ across the decade avoids the necessity of applying complex correction factors to the recorder reading, and thus makes possible the direct reading of mol percentages.

The modification of FIG. 3 is a broad range measuring circuit intended to measure very low concentrations of a particular isotope or substance in a mixture, as well as the normal ratios. This is accomplished by changing the sensitivity of one of the amplifier stages, such as low current amplifier 5' which feed resistors R'$_4$ and R'$_5$. At the same time, it is desired to impress across potentiometer 10' a voltage that will represent the true (unmultiplied) concentration of the isotope or substance to be measured.

To increase sensitivity of the low current amplifier 5' grid resistors 13', 14' and 15', of different value may be selectively inserted in the input circuit of the amplifier by switch 16'. When switch 16' is on contact X-1, a resistor of normal resistance is inserted in the grid circuit of amplifier 5' and a normal output voltage is obtained at the output of the amplifier. If switch 16' is moved to contact X-10, a resistor ten times as great is inserted in the grid circuit of the amplifier and the sensitivity for low ion currents is correspondingly increased. In like manner, if switch 16' is moved to contact X-100 position, a resistor one hundred times as great is placed in the input circuit of amplifier 5', and sensitivity thereof is further increased.

The result of this is to increase the voltage output of amplifier 5' as the switch 16' is progressively moved from contact X-1 to contact X-100. This is desired for the circuit of resistors R'$_4$ and R'$_5$ between the contacts of ganged switch S'$_6$ where increased voltage is needed to measure the lower ratios. However, it is not necessary to correspondingly increase the voltage impressed across potentiometer 10' from amplifier 5' as switch 16' selectively passes across contacts X–10 and X–100 from X–1, but instead it is desired to have it correspond to the normal voltage output of amplifier 5' regardless of the position of the switch 16'.

In the arrangement for carrying this out, resistor $R'_4$ and $R'_5$ are so tapped that .9 of the voltage is dropped across the lower sections, 0.9 across the intermediate sections, and .01 across the upper sections, and the ganged sliders of switch $S'_6$ are so spaced that the drop across the section of resistance of $R'_4$ and $R'_5$ bridged by them is always unity regardless of the position of the switch.

Referring more in detail to FIG. 3, when switch 16' is set on contact X–10, gang switch $S'_6$ is positioned as shown in that figure. In this position, exactly 0.1 of the voltage dropped across $R'_5$ is applied to the potentiometer 10. It will be noted that .9 of the voltage dropped across $R'_5$ is not applied to the potentiometer 10, and that .9 of the voltage dropped across the resistor $R'_4$ is applied to the balancing circuit of the recorder 12'. This causes the slide to move up the slide wire 11' to balance the circuit. The resulting reading of recorder 12' is then read as .1 of the indicated reading to get the correct value. As best illustrated in the equivalent circuit of FIG. 3A, the voltage $E_{RD}$ across the decade 10 now is $E_{234+238}+E_{235}$. The voltage balanced by $kE_{RD}$, however, is the full input voltage $10E_{235}$. Thus, the voltage-multiplication obtained with the X–10 input resistor is applied in the balancing circuit to achieve increased sensitivity, but is not applied across the decade. Under these conditions (see FIG. 3A), the following relationship obtains at circuit balance:

$$\frac{kE_{RD}}{E_{RD}} = \frac{10E_{235}}{E_{234+238}+E_{235}}$$

To obtain the proper mol ratio, it is necessary for the operator only to apply the scale factor $$\frac{R'_{234+238}}{R'_{235}}$$

i.e., 1/10. The circuit operates in an analogous manner on the X'–100 scale. To summarize: The determination of mol percent on any scale is as follows:

$$\text{Mol percent U-235} = \frac{R'_{234+238}}{R'_{235}} \times \left[\frac{\frac{R'_{235}}{R'_{234+238}} \times E_{235}}{E_{235}+E_{234+238}}\right] \times 100$$

where the resistance ratio outside the brackets is the aforementioned scale factor applied by the operator, and the resistance ratio inside the brackets is the reduction factor applied by the circuit. Since the output voltages are proportional to the input currents, the recorder can be calibrated in mol percent U–235, and the operator need only apply the proper scale factor to the recorder reading.

Since the subject circuit is adapted for the measurement of mol percentages, it is readily adaptable for the measurement of weight percentage. Assume, for example, that the subject circuit is switched to "Mol Percent" and to the X–1 contact. Then, $$\text{Mol percent U-235} = \frac{E_{235}}{E_{234+238}+E_{235}} \times 100$$

Weighting each of the voltages in terms of the weight of U–238, then Weight Percent=U–235=

$$\frac{E_{235}\frac{235}{238}}{E_{234}\frac{234}{238}+E_{235}\frac{235}{238}+E_{238}} \times 100$$

Assuming the amount of U–234 to be negligible, then Weight Percent U–235=

$$\frac{E_{235}(0.9874)}{E_{235}(0.9874)+E_{238}} \times 100$$

It is apparent the resistors $R_4$ and $R_5$ and/or the decade resistors can be selected to weight E–235 as described. If the amount of U–234 in the sample is not negligible, but can be assumed to vary in direct proportion with the amount of U–235, accurate determinations can be made by building a correction factor into the circuit. This could be done by altering the values of $R'_4$ and $R'_5$ and/or the resistors of decade 10' as required. If the proportion of U–234 to U–235 is not constant from sample to sample, the resistors could be preselected to provide at least a partial correction.

When the isotopic composition of a gas sample is determined by comparison with a standard gas sample, the operating conditions normally are such that the only variable is the gas pressure in the spectrometer source. Ordinarily, this pressure is controlled by noting the value of the higher signal (e.g., $E_{238}$) when the standard sample is run, and adjusting the gas input to the source so that the same signal ($E_{238}$) is produced when the unknown sample is run. However, since the composition of the standard and the unknown will not be identical, this procedure fails to maintain exactly the same source pressure or gas flow from run to run. It was discovered that closer control will be obtained by regulating the gas flow with the signal $E_{234+238}+E_{235}$—that is, with the total ion current. Proceeding in this manner also improves operation by eliminating the effects of any non-linearity in the ionization, beam formation, beam separation, and beam collecting mechanisms since the total ion current and the ionization chamber pressure will be maintained at constant values.

The inventor has found that regulation of gas flow into the source with the total ion current will reduce "memory effect." There is evidence that memory effect is caused in part by the physical interchange of material present on the walls of the source inlet system. This physical interchange will be minimized if the pressure and flow conditions in the inlet system are standardized from run to run; and this can be accomplished effectively by regulating the pressure and flow with the total ion current. As pointed out above, it is conventional to regulate gas flow into the source by maintaining the larger output signal constant. With that type of control, however, the flow varies in such a direction as to allow any physical interchange of samples to have an effect proportional to the difference in sample concentration.

Having thus described my invention, I claim:

1. A measuring circuit for a plural collector mass spectrometer comprising a high current feed back amplifier having an odd number of plate amplifier stages set for maximum output on minimum input signal having its input coupled to at least one of the collectors of said spectrometer, a bucking battery in the output of said high current amplifier to normally overcome the output therefrom, a low current amplifier having an odd number of plate amplifier stages set for maximum output on minimum input signal having its input coupled to another of said collectors, a bucking battery in the output of said low current amplifier to normally overcome the output therefrom, means for changing the input impedance of said low current amplifier to alter its sensitivity, a voltage divider coupled to the outputs of said high current amplifier and said low current amplifier to combine their signals, a second voltage divider coupled to the output of the low current amplifier to receive signals therefrom, a recording potentiometer for bridging said first named voltage divider and said second named voltage divider to measure abundance ratio and mol percent, and adjustable means for altering the coupling between the recording potentiometer and the said second voltage divider and between said first and said second voltage dividers for increasing the accuracy of measurement of low abundance ratios and mol percentages.

2. In a mass spectrometer provided with a plurality of collector electrodes, a circuit arrangement associated with said electrodes comprising a point of reference potential; a first amplifier circuit provided with a cathode follower output, an input connected to a first and a third of said electrodes, and characterized by 100 percent feed back; a second amplifier circuit having a cathode follower output stage including a pair of cathode resistors, an input coupled to a second of said electrodes, and characterized by substantially 50 percent feed back; first and second load impedances and bucking potential sources connecting said outputs to said reference point; a self-balancing recording potentiometer provided with moveable input and output arms; a second arm ganged to said input arm; means coupling one end of said potentiometer to said second arm; means coupling the other end of said potentiometer to the junction of said first impedance and source; a plurality of taps on said second impedance and one of said cathode resistors to contact said moveable arms to provide said recording potentiometer with a signal proportional to the total ion current received on said electrodes.

3. A measuring circuit for a plural collector mass spectrometer comprising a high current amplifier fed from the high ion collector, a low current amplifier fed from the low ion collector, a voltage divider comprised of a pair of series connected equal impedances similarly tapped to provide a progressively greater impedance gradient, a voltage divider network including serially connected resistors and the slide wire of a self-balancing recording potentiometer having one end coupled to the output of the high current amplifier, ganged contacts bridging corresponding taps on said impedances for movement over the tapped impedances while maintaining constant impedance between them, one of said contacts being coupled to the opposite end of said voltage divider network, and the arms of said recording potentiometer being bridged across potentiometer resistance element and the other of said movable contacts to receive signals solely from said high current amplifier and said low current amplifier to provide a reading of relative ion abundance at said high ion collector and said low ion collector.

4. A measuring circuit for a mass spectrometer having a plurality of ion collectors comprising, a direct current 100 percent feedback amplifier coupled to at least one of said collectors to receive a selected portion of the mass spectrometer ion current and to generate an output voltage proportional thereto, an impedance connected to receive the output voltage from said 100 percent feedback amplifier, a direct current 50 percent feedback amplifier coupled to at least one other of said collectors to receive another selected portion of the mass spectrometer current and to generate an output voltage proportional thereto, a pair of impedances of equal value joined in series combination and connected to receive the output voltage from said 50 percent feedback amplifier, an end of the first named impedance being connected to the junction of said pair of impedances to maintain the voltage drops across said first named impedance and one of said pair of impedances in additive relation, a slidewire including a voltage divider connected across said first impedance and a selected part of said series combination of impedances to receive signals solely therefrom, and a voltage-balancing device connected between said slidewire and an intermediate point of said series combination of impedances to measure mol ratio.

5. The combination according to claim 4, wherein the individual impedances of said pair of impedances are identically tapped to form in combination a put-and-take impedance, and switching means to make the said connections between said voltage divider and said series combination and between said balancing device and said series combination, whereby said voltage divider and said balancing device are connected to corresponding taps on said pair of said impedances.

References Cited in the file of this patent

UNITED STATES PATENTS

| | | |
|---|---|---|
| 2,648,008 | Sink | Aug. 4, 1953 |
| 2,662,185 | Robinson et al. | Dec. 8, 1953 |
| 2,913,654 | Clark | Nov. 17, 1959 |

OTHER REFERENCES

Journal of Scientific Instruments, vol. 30, Nov. 1953, article by R. K. Wanless and H. G. Thode, entitled A Mass Spectrometer for High Precision Isotope Ratio Determinations, pages 395–398.

UNITED STATES PATENT OFFICE
CERTIFICATE OF CORRECTION

Patent No. 3,076,091                                              January 29, 1963

John R. Mahoney

It is hereby certified that error appears in the above numbered patent requiring correction and that the said Letters Patent should read as corrected below.

Column 5, line 7, for "0.9" read -- .09 --.

Signed and sealed this 3rd day of December 1963.

(SEAL)
Attest:
ERNEST W. SWIDER

Attesting Officer

EDWIN L. REYNOLDS

Acting Commissioner of Patents